United States Patent
Rutt

[15] 3,679,950
[45] July 25, 1972

[54] CERAMIC CAPACITORS

[72] Inventor: Truman C. Rutt, Niagara Falls, N.Y.

[73] Assignee: N L Industries, Inc., New York, N.Y.

[22] Filed: April 16, 1971

[21] Appl. No.: 134,689

[52] U.S. Cl. ............................317/258, 117/227, 317/242, 317/261
[51] Int. Cl. ......................................................H01g 1/01
[58] Field of Search ..................117/227; 317/258, 261, 242

[56] References Cited

UNITED STATES PATENTS

| | | | |
|---|---|---|---|
| 2,421,652 | 6/1947 | Robinson | 317/258 X |
| 2,939,059 | 5/1960 | Gravley | 317/258 X |
| 3,223,905 | 12/1965 | Fabricius | 317/258 |

Primary Examiner—E. A. Goldberg
Attorney—Ashlan F. Harlan, Jr.

[57] ABSTRACT

A sintered ceramic article which comprises internal electrodes and/or conductors is formed by producing a sintered ceramic body that has areas of ceramic with interconnected pores extending to an outer face thereof and providing a conductor in said porous areas. The ceramic body may be formed by depositing, as by screen printing, on sheets of a powdered dielectric or insulating ceramic material bonded with a temporary bond, an area of a temporarily bonded powdered ceramic material which on firing becomes porous, consolidating a plurality of such sheets, and sintering them. Subsequently a conductive material may be provided in the porous areas by impregnating said areas with a conductive material or with a material which is reacted or decomposed to form a conductive material in said areas.

12 Claims, 7 Drawing Figures

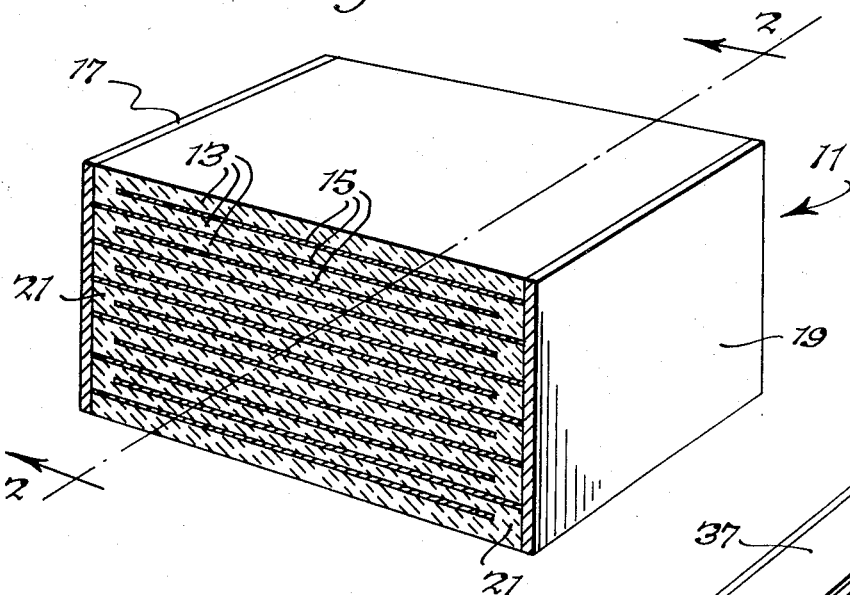
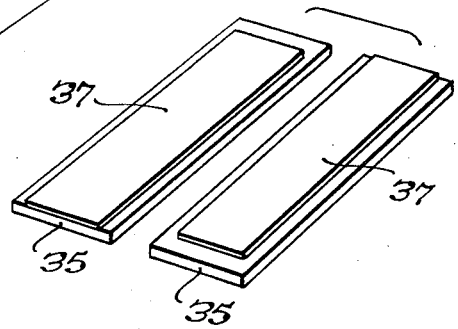
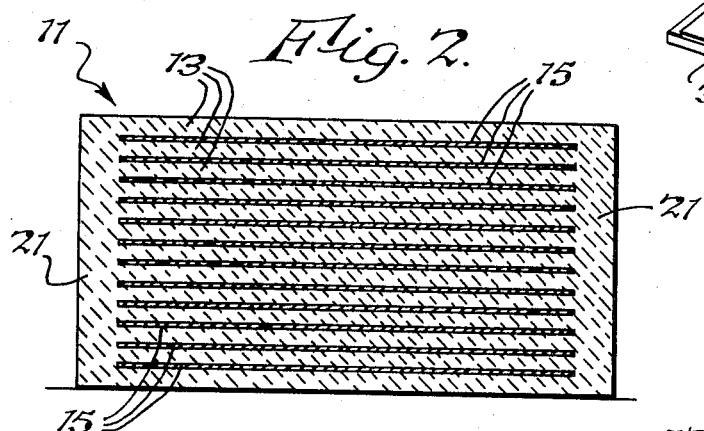
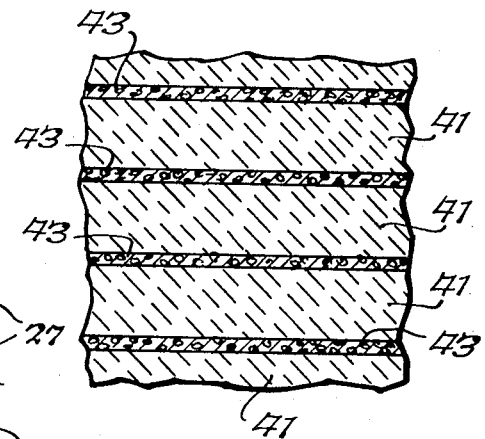
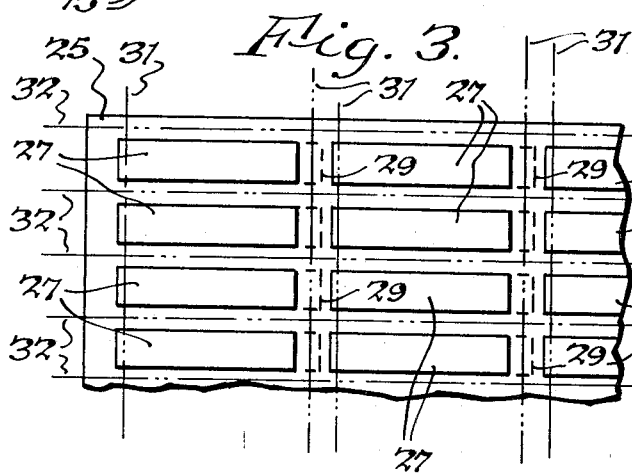

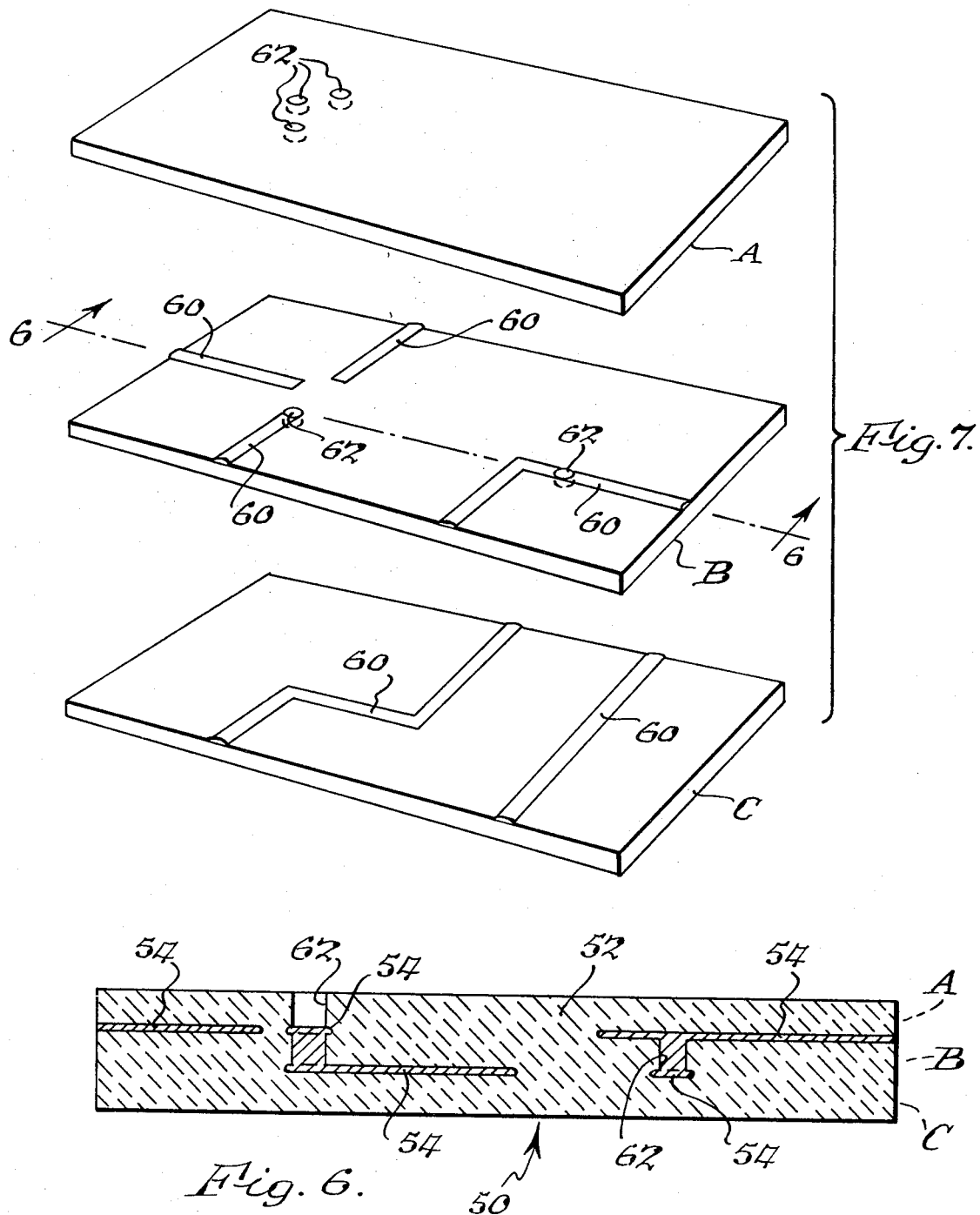

3,679,950

CERAMIC CAPACITORS

BACKGROUND OF THE INVENTION

The invention of the present application relates to the formation of electrodes and/or conductors in ceramic dielectric or insulating bodies and is particularly concerned with the provision of such electrodes and/or conductors by a procedure which obviates the necessity of firing them at the same time that the ceramic bodies, with which they are associated, are fired. Examples of products which may be produced in accordance with the invention are monolithic capacitors and multilayer circuit structures such as are used for hybrid integrated circuits.

Ceramic capacitors have been in use for many years and for many purposes have replaced paper, mica, and other types of capacitors because of the relatively high dielectric constant of barium titanate and certain other available ceramic materials. This has permitted the production of high-capacitance, miniaturized bodies; and high-speed pressing procedures have been developed to reduce production costs. However, there has still been a demand for even higher capacities in very small bodies. Multilayer, monolithic, ceramic capacitors have been produced to meet this demand.

While there are many variant processes in use for the production of such monolithic, ceramic capacitors, in a typical process a doctor blade is used to cast on a smooth, non-absorbent surface, a thin layer of a suitable ceramic dielectric composition mixed with a solution of an organic binder. After the layer dries, the resultant sheet may be cut into small pieces of rectangular shape to which an electroding paste of a noble metal such as platinum or palladium is applied by a silk-screening procedure in such a way that a margin is left around three sides of the metal coating, but the electrode paste extends to one edge of the small sheet. A plurality of the sheets with electrode paste thereon are then stacked with alternate sheets having the electrode paste extending to opposite edges. The stack of sheets is then consolidated and heated to drive off or decompose the organic binders of the sheet and the electroding paste and to sinter the dielectric composition into a unitary body having electrodes exposed alternately on each end so that those exposed at each end may be connected together electrically by metallizing the ends of the body. Thus, there is obtained a capacitor which may have from a few to a great number, 50 or more being common, of very thin (often 0.05 mm or less) ceramic dielectric layers. Such capacitors have very high capacitance densities and thus the use of extremely small units in many circuits is permitted.

It may be seen from the foregoing description that considerable expense is involved in the production of monolithic ceramic capacitors because of the necessity for using noble metal electrodes. Silver electrodes, such as are commonly used with other ceramic capacitors, are generally unsuitable therein because firing to a high temperature is required after the electrodes are applied.

It is, accordingly, one of the objects of the present invention to provide a process by which the cost of monolithic, ceramic capacitors may be reduced by eliminating the use of noble metal electrodes.

Another object of the present invention is to provide a procedure for making ceramic articles having conductive areas therein which does not require the firing of the conductive material at the same time the ceramic article is formed by firing.

It is also an object of the present invention to produce multilayer circuit structures for hybrid integrated circuits in which conductors for attachment of components are provided at various levels in a ceramic substrate or matrix.

SUMMARY OF THE INVENTION

The first two of the above-stated objects are achieved by forming a sintered, monolithic, ceramic body which comprises a plurality of thin strata. The strata are of two types, strata of one type being dense and impervious and being formed of ceramic dielectric material with a relatively high dielectric constant, and strata of the other type being of ceramic material but being characterized by a high degree of connected porosity. Strata of one type alternate through the thickness of the body with strata of the other type. This is done by introducing between sheets of a powdered ceramic dielectric composition bonded with a temporary bond, a deposit of a temporarily bonded, powdered ceramic material that on firing develops a network of interconnected pores, consolidating a plurality of such sheets with intervening deposits and firing the consolidated mass to sinter it. Alternate porous strata extend to a pair of different edge regions of the sintered body; but, since the deposits of the second-mentioned ceramic material, and thus the porous strata, are smaller in area than the dense dielectric strata, the other edge regions of the fired body and the interior thereof immediately adjacent the latter-mentioned regions are composed exclusively of the dielectric material.

The monolithic ceramic bodies, after firing, are converted to capacitors by providing a conductive material in the porous areas within the bodies. This may be done in several ways, as hereinafter described. The conductive material may be introduced into the porous areas directly or a material may be introduced which is thereafter decomposed and/or reacted to form a conductive material in the areas which have interconnected pores. In any event, there is thus formed a monolithic capacitor having a very high volume capacitance which can be provided with termination electrodes at the regions where the conductive material is exposed and which does not require noble metal internal electrodes.

A very similar technique is employed in producing multilayer circuit structures. In such production, thin sheets of a powdered ceramic, insulating material temporarily bonded with a fugitive bond are provided with a desired pattern of lines, pads, and the like of a ceramic composition (which may be termed a pseudoconductor) that on firing becomes porous, the pores therein being interconnected. The sheets are then stacked, compacted, and fired to produce sintered bodies with predetermined porous areas into which there is introduced a conductive material or a composition from which a conductive material is formed.

SHORT DESCRIPTION OF THE DRAWINGS

FIG. 1 is an enlarged sectional view of a finished, monolithic, ceramic capacitor in accordance with the present invention;

FIG. 2 is a sectional view along the plane of the line 2—2 of FIG. 1;

FIG. 3 is a plan view of a bonded sheet of a ceramic dielectric composition having deposited thereon, in a pattern, a ceramic composition suitable for formation of a porous stratum;

FIG. 4 is an enlarged perspective view of two sheets of a bonded ceramic, dielectric composition, each sheet having an area thereon covered with a ceramic composition suitable for formation of a porous stratum;

FIG. 5 is a further enlarged, detail sectional view of a body according to the present invention after assembly and sintering of a plurality of sheets such as shown in FIG. 4;

FIG. 6 is an enlarged, sectional view of a multilayer ceramic circuit structure according to the present invention; and FIG. 7 is an enlarged, exploded view showing the several ceramic sheets forming the structure shown in FIG. 6 with pseudoconductors thereon.

DETAILED DESCRIPTION OF THE INVENTION

A preferred process for preparing monolithic ceramic capacitors according to the present invention is broadly as follows:

A suitable, finely divided, ceramic, dielectric material is formed into a thin film with the aid of a suitable heat-removable film-forming agent. After drying, the film is cut into sheets of suitable size. On these sheets is then applied a thin layer, film, or coating, in a desired pattern, of a suitable paste or the like containing a fugitive or heat-removable binder and a powdered ceramic composition which when fired at sintering temperatures will, instead of becoming dense and compact, form a structure with a network of interconnecting pores. A plurality of the thus-coated ceramic sheets is assembled in stacked relation, consolidated into a block, and cut into smaller blocks or chips. The latter are heated to remove the film-forming, temporary binding agents and are then further heated to a high temperature in air to produce small, coherent, sintered bodies with dense, ceramic dielectric strata alternating with porous, ceramic strata. In each of the chips the porous strata extend to an edge face and thus may be infiltrated or impregnated with a conductive material or with a compound that can be decomposed or reacted in the connected pores of the porous strata to provide a conductive deposit therein. Upon suitable infiltration or impregnation, and if necessary, decomposition or suitable reaction to form such conductive deposits, there is obtained a structure in which layers of dielectric material and conductive material alternate, thus providing a monolithic capacitor.

The drawings depict such a structure, FIGS. 1 and 2 illustrating on an enlarged and exaggerated scale a monolithic capacitor 11 having thin layers 13 of dielectric material with thinner layers 15 of conductive material interposed between the layers 13. As will be seen in FIG. 1, the layers 15 are so formed that alternate ones extend to the opposite end faces of the capacitor and are there connected together electrically by metallizing the ends in a suitable, known, manner to provide the end or termination electrodes 17 and 19. Where, as shown at 21, there is no intervening conductive material, the dielectric layers 13 are united.

In FIG. 3 there is shown a film or sheet 25 of temporarily bonded dielectric material on which a paste or the like, containing a fugitive binder and a ceramic composition which on firing to sintering temperatures will form a porous structure with interconnected pores, has been printed in small areas 27 to form a pattern.

In FIG. 4 there are shown, enlarged, two small thin sheets 35 of dielectric material bonded with a fugitive bond, each of the sheets 35 having thereon a layer, film, or coating 37 of a temporarily bonded ceramic composition that on firing will form a sintered structure with a network of interconnecting pores. The sheets 35, which may be formed individually or by appropriate cutting of larger sheets such as the sheet 25 (FIG. 3), are arranged so that when superimposed or stacked the ends of the layers 37 that extend to the edges of the sheets will be at opposite ends of the stack. When a plurality of such sheets are stacked and fired at sintering temperatures a structure like that shown in FIG. 5 is obtained.

In FIG. 5 there is shown, further enlarged, a partial sectional view of a sintered body in accordance with the present invention with alternating dielectric strata 41 and porous strata 43, the latter being adapted to receive a conductive material.

In the following examples, details of the production, according to the present invention, of monolithic ceramic capacitors are set forth.

EXAMPLE 1

An uncalcined ceramic dielectric composition consisting of 93 percent of barium titanate ($BaTiO_3$) and 7 percent of bismuth zirconate ($Bi_2O_3 \cdot 3ZrO_2$) is employed. A mix of 100 g of the dielectric composition in finely divided form (approximately 1.5 $\mu$ m particle size) with 65 ml of toluene, 3 g butyl benzyl phthalate, 10 ml dichlorethane, and 2 ml acetic acid is ball milled for 4 hours. To the ball milled product there is then slowly added, with stirring, an additional 20 ml of dichlorethane and 4 g of ethyl cellulose. If necessary to eliminate bubbles, the stirring may be slowly continued for several hours. A film of the mixture approximately 610 by 102 mm in area by 0.051 mm thick is formed with a doctor blade on a sheet of smooth plate glass. When the film dries, the sheet thus formed is removed and small rectangular sheets or leaves approximately 102 by 51 mm are cut therefrom.

The composition for the porous strata is formed from a second ceramic composition consisting of 66.94 percent barium carbonate ($BaCO_3$), 27.1 percent titanium dioxide ($TiO_2$), 3.32 percent bismuth oxide ($Bi_2O_3$), and 2.64 percent zirconium oxide ($ZrO_2$), all in powdered form, blended on a 1:1 weight basis with a vehicle of the type known as squeegee media which is composed of 80 ml pine oil, 14 g acrylic resin, and 1.5 g lecithin dispersing agent to which 1.3 percent (based on the total weight of all other ingredients of the composition) of ethyl cellulose is added to increase the viscosity. The average particle size of the $TiO_2$ in the composition is preferably from about 5 to 10 $\mu$ m and the particle sizes of the other ceramic ingredients used preferably average from about 1 to 2 $\mu$ m. This composition is screen printed approximately 0.038 mm thick in a recurring pattern, such as shown in FIG. 3, on the small leaves of dielectric composition formed as described above. The printed leaves are then indexed and stacked in groups of 10 so that the printed patterns on alternate leaves are offset. The broken lines 29 in FIG. 3 indicate the placement of the printed pattern on the sheets above and/or below the sheet 25 when the sheets are stacked. The stacked sheets are pressed at about 85°C and 28 kg/cm² to form blocks. The blocks are then cut, by suitable means such as knives, to form smaller blocks or chips, the cutting being done along such lines as the broken lines 31 and 32, so that in each of the smaller blocks the alternate strata of screen printed composition are exposed on opposite ends but are not exposed on the sides.

The smaller blocks are then heated quite slowly in air to drive off and/or decompose the temporary binding material in the ceramic layers and are thereafter fired at a high temperature, also in air, to form small, coherent, sintered chips or bodies.

A suitable heating schedule for removal of the temporary binding material is as follows:

100°C – 16 hours      295°C – 2 hours
150°C – 16 hours      325°C – 1.5 hours
175°C – 8 hours       355°C – 1 hour
210°C – 16 hours      385°C – 1 hour
225°C – 8 hours       420°C – 0.5 hour
250°C – 16 hours      815°C – 0.5 hour The temperature is then raised to 1,260°C and maintained for 2 hours to sinter the chips.

The sintered chips obtained, after cooling, are treated by one of the procedures hereinafter described to provide conductive material in the porous strata and are provided with termination electrodes on their opposite ends to obtain efficient monolithic capacitors.

In the foregoing example the porous strata of the monolithic ceramic capacitors are essentially the same chemically as the dense dielectric layers, the porosity of the porous strata being produced as a result of the decreased volume occupied by the ceramic material used after the reaction thereof which occurs during heating. In the following two examples the porous strata are chemically different from the dielectric strata.

EXAMPLE 2

A finely divided (approximately 1.5 $\mu$m particle size) ceramic dielectric composition consisting of 98% $BaTiO_3$ and 2 percent niobium oxide ($Nb_2O_5$) is employed. A mix consisting of 480 g of the powdered dielectric composition, 4.8 g of a lecithin dispersing agent, 12.6 g of dibutyl phthalate, and 75 ml of toluene is ball milled for 4 hours. There is then added 156 g of a 40 percent acrylic resin — 60 percent toluene solution. The mixture is slowly stirred for a period of time sufficient to increase the viscosity by evaporation of solvent and to remove entrapped air. It is then cast on a smooth glass plate in a sheet about 610 mm square and allowed to dry. The air-dried cast sheets are about 0.07 mm thick and are cut into smaller sheets or leaves approximately 102 by 51 mm.

The composition for the porous strata is formed from a second mixture consisting of barium oxalate ($BaC_2O_4$) and $TiO_2$ in a 1:1 mol ratio. The $TiO_2$, which comprises 26.17 percent of the mixture, preferably has an average particle size of about 2–5 $\mu$m. The mixture is blended in a 1:1 weight ratio with the squeegee medium described in Example 1 and screen printed in a predetermined recurring pattern on the small leaves of dielectric material. The printed leaves are then indexed, stacked 15 high, and compacted. The thus formed blocks are cut, as in Example 1, to form a plurality of smaller blocks or chips, in each of which alternate layers of the screened-on composition extend to opposite end faces of the chips, but are otherwise inaccessible.

The chips are heated in accordance with a suitable schedule, which may be the one set forth in Example 1, to eliminate the binder and are then fired for about 2 hours at about 1,325°C to sinter them. As in Example 1, the strata between the dense dielectric strata have a network of interconnected pores as a result of the relatively greater shrinkage when the barium oxalate and $TiO_2$ react to form $BaTiO_3$. After cooling, the fired chips may be treated as hereinafter described to provide conductive material for electrodes in the porous areas formed between the dielectric strata and thereafter provided with termination electrodes by suitable known procedure.

Even more widely different ceramic materials in the dielectric layers and porous layers, respectively, are used in the following example.

EXAMPLE 3

A mixture is made of 472.8 g $TiO_2$ (average particle size about 1.5 $\mu$m), 7.2 g kaolin, 4.8 g lecithin dispersing agent, 13.6 g dibutyl phthalate, and 75 ml toluene and this mixture is ball milled for 4 hours. It is then mixed with 124.9 g of a 1:1 acrylic resin-toluene solution and, after de-airing, is cast on a smooth glass plate with a doctor blade to a thickness of 0.2 mm to produce on drying a sheet about 0.08 mm thick which is cut into smaller sheets approximately 102 by 51 mm.

Using the procedure of Example 2, the smaller sheets are screen printed in a predetermined recurring pattern with a composition formed by mixing 27.58 percent powdered alumina ($Al_2O_3$) having an average particle size of 2.5 $\mu$m, 14.14 percent carbon black, and 58.27 percent of the squeegee medium described in Example 1. The printed sheets are then indexed, stacked 10 high, compacted, and cut to form a plurality of blocks or chips in each of which alternate layers of the screened-on composition extend to opposite end faces of the chips, but are otherwise inaccessible.

The chips are heated and then fired in substantially the same way as the chips in Example 1, a final firing for 2 hours at about 1,320°C being employed. As in Example 1, the strata between the dense dielectric $TiO_2$ strata have a network of interconnecting pores. These result from the combustion of the carbon black and the larger particle size of the $Al_2O_3$. The porous strata are provided with a conductive material, by one of the procedures hereinafter disclosed, to form electrodes and termination electrodes are applied.

In the following example another procedure for obtaining bodies with alternate dielectric and porous strata is illustrated.

EXAMPLE 4

Small sheets or leaves of a resin-bonded dielectric ceramic composition are prepared in the manner set forth in Example 2. A screen printing composition is made by blending 16 g of the squeegee medium described in Example 1 with 12 g $BaTiO_3$ (approximately 4 $\mu$m particle size) and 4 g carbon black, Stoddard solvent being added as necessary to obtain the desired viscosity. This composition is then screened on the leaves in the same manner as in Example 2 and allowed to dry. Blocks and smaller cut blocks or chips are formed from the printed leaves in the same way as in Example 2 and the chips are heated and fired, also in the same way. In the course of the firing the carbon black burns out leaving a network of interconnected pores in the areas between the dense dielectric strata. The use of the relatively coarse $BaTiO_3$ in the printing composition increases the porosity. These porous areas are filled with conductive material in one of the ways described hereinafter and provided with end electrodes to form monolithic capacitors.

Still another way of forming monolithic ceramic capacitors according to the principles of the present invention is illustrated in the following example.

EXAMPLE 5

A sheet about 0.08 mm thick of a ceramic dielectric material such as the one produced in Example 2 is cut into smaller sheets or leaves approximately 20 by 20 mm. Another sheet of slightly less thickness, for providing porous strata, is formed by casting a composition formed from 351 g $BaTiO_3$, 7 g $Nb_2O_5$, and 115 g carbon black, these ingredients being ball milled for several hours with toluene and dibutyl phthalate and then, after admixture with a 1:1 acrylic resin-toluene solution, de-aired before casting. The second sheet is cut into leaves approximately 13 by 16 mm. The leaves of dielectric material and of the other ceramic material are then stacked 11 high with their side edges aligned and equally spaced from the edges of the larger leaves. Alternate leaves of the second composition are laid in place so that the ends thereof extend to opposite edges of the dielectric material leaves. The stack is then consolidated by pressing at about 7 kg/cm$^2$ and a temperature of about 40°C and the consolidated block is heated to burn out the temporary binders and the carbon black and to sinter the ceramic materials into a structure in which porous ceramic strata alternate with dense ceramic dielectric strata. A heating schedule like that specified in Example 1 is used, the final temperature, however, being 1,370°C for 2 hours, firing being in air. The fired block is provided with conductive material in the porous strata, thereby forming electrodes by any of the procedures described hereinafter.

In the following example there is described a procedure for providing conductive material in the porous areas of small, sintered, ceramic bodies or chips such as are produced by the processes set forth in the preceding examples.

EXAMPLE 6

A plurality of small, sintered ceramic chips or bodies made in accordance with Example 1 are immersed in a saturated aqueous solution of silver nitrate ($AgNO_3$) held at 25°C in a vessel equipped for evacuation. The pressure in the vessel is then reduced to 10 cm of mercury and restored to normal, the porous strata of the bodies being thus filled with the solution. The chips are then removed and heated in a small tunnel kiln at about 815°C for half an hour to decompose the $AgNO_3$ leaving silver deposits in the porous areas. The above-described procedure is repeated several times, preferably at least three, whereby at least a substantial, and preferably a major, portion of the interconnected pores in each porous stratum are coated on their internal surfaces with silver, thus forming an electrode between the adjacent dense dielectric strata, the electrodes produced extending to the exposed end faces of the porous strata. A termination electrode may be provided on each end face to join electrically the plurality of electrodes extending thereto and provide means for attaching electrical leads to the capacitor. Such termination electrodes may be applied in accordance with conventional procedure or in any other desired manner. Any undesired silver deposits on the exterior of the capacitor may be removed by a gentle sand blasting.

Other procedures that may be employed to produce internal electrodes in the porous strata of ceramic units are set forth in the following examples.

EXAMPLE 7

A plurality of small, sintered ceramic chips made in accordance with Example 1 are immersed in a bath of molten silver nitrate held at about 250°C in a vessel equipped for evacuation. The pressure in the vessel is then reduced to 10 cm of mercury and restored to normal, thus causing infiltration of the silver nitrate into the porous strata of the chips. The chips are then removed and heated in air in a small tunnel kiln at a temperature in the range from about 700°C to about 840°C for one-half hour to decompose the silver nitrate and produce a deposit of silver in the pores of each porous area. The above-described procedure is repeated until at least a substantial, and preferably a major, portion of the interconnected pores in each porous stratum have silver coatings on their internal surfaces, thus providing electrodes between the dielectric strata. Termination electrodes may then be provided as described above and undesired silver deposits may be removed.

EXAMPLE 8

The porous strata of sintered ceramic chips, such as those made in accordance with one of Examples 1–5, are impregnated with silver nitrate in accordance with the procedure of Example 6 and are then placed in a sintered alumina tube and heated to a temperature in the range from about 150°C to about 215°C while a current of hydrogen gas is passed over them until the silver nitrate in the porous strata is reduced to metal. These impregnating and heating steps are repeated several times whereby to obtain enough reduced silver in the porous strata to constitute suitable electrodes. The chips may then be cleaned and provided with termination electrodes as described above.

EXAMPLE 9

The general procedure of Example 8 is followed except that hydrazine vapor is employed as a reducing agent instead of hydrogen to obtain reduced silver in the porous strata of the chips. The chips are maintained at about 25°C in the hydrazine vapor.

It will be understood that both hydrogen and hydrazine as reducing agents may also be used with chips that have been impregnated with molten silver nitrate as set forth in Example 7. It will also be recognized that molten metal can be introduced directly into the porous strata of the chips to form electrodes. The following example illustrates this procedure.

EXAMPLE 10

A plurality of sintered chips made in accordance with Example 1 are placed in a bath of a molten metal alloy consisting of 50% Bi, 25% Pb, 12.5% Sn and 12.5% Cd. The molten metal is held at a temperature from about 100°C to about 125°C in a suitable closed vessel. After introduction of the chips the pressure in the vessel is reduced to evacuate the porous strata (of the chips and the pressure is then raised to about 14 kg/cm$^2$ to force the molten metal into the interconnecting pores. The chips after removal from the bath contain electrodes formed by deposit of the alloy in the porous strata between the dense dielectric strata and, after the provision of termination electrodes in any desired manner, are satisfactory monolithic capacitors.

Still another procedure for obtaining a metal deposit in the porous areas of sintered ceramic chips is the following:

EXAMPLE 11

The porous areas of a plurality of chips such as those produced in accordance with Example 2 are impregnated with a liquid resin, preferably one having a high carbon content, such as an epoxy resin, by immersing the chips in the resin, reducing the pressure to about 10 mm of mercury, and restoring atmospheric pressure. The impregnated chips are then heated to about 370°C for about an hour to decompose the resin, thus forming in the porous strata in the chips a porous, black, carbonaceous residue. The chips are then placed in molten silver nitrate held at about 340°C under a vacuum of about 750 mm of Hg for 15 minutes, removed and cooled. Examination of broken chips reveals metallic silver in the porous areas, probably as a result of the reducing action on silver nitrate of the carbonaceous material in such areas. The procedure can be repeated to obtain suitable electrodes.

The present invention also comprehends the use of nonmetallic internal electrodes in a monolithic ceramic capacitor. This is illustrated in the following example.

EXAMPLE 12

A plurality of the small sintered ceramic units or chips made in accordance with Example 1 are immersed in an aqueous nitric acid solution having a resistivity at 1 kHz of 1.34 ohm - cm. The pressure in the vessel containing the units and acid is then reduced to about 10 mm of Hg to permit the acid to infiltrate into the porous strata of the units when the pressure is raised to normal. After pressure in the vessel is restored, the impregnated chips are removed from the vessel, the liquid electrodes formed by the acid being retained in the capacitors by sealing the edge faces where the porous strata are exposed with soft lead foil. The foil also constitutes termination electrodes for the resulting capacitor.

Other materials and procedures may, of course, be used in providing electrodes in the porous strata of sintered ceramic chips produced in accordance with the invention. For example, other low-melting metals or alloys, e.g. lead, can be used instead of the alloy disclosed in Example 10 and certain conductive ceramic materials, such as tin oxide containing up to 2 percent of antimony oxide, have resistivities low enough to be employed as electrodes. Conductive deposits other than silver can also be produced in the porous strata or areas by the decomposition therein of suitable compounds which have been introduced. For example, a metal carbonyl such as nickel carbonyl may be introduced into the porous areas and thermally decomposed therein by a procedure such as that disclosed in U. S. Pat. No. 2,918,392 to Beller.

Although in Examples 1–3, inclusive, the dielectric materials used are modified barium titanate compositions, it will be clear that others of the large number of ceramic dielectric compositions known may also be used. For example, TiO$_2$ (note Example 3), glass, steatite, and barium strontium niobate, as well as barium titanate alone can be used, suitable changes, well known in the art, being made as required in firing conditions and the like to achieve proper sintering. Obviously, the capacitance of the resulting capacitors will vary as a result of using materials with higher or lower dielectric constants.

It will also be understood that the composition of the porous strata in ceramic chips according to the invention may vary widely. Not only may the porosity of the areas or strata be achieved by use of a composition which is identical with or similar to the composition of the dielectric strata, although having a greater shrinkage on firing, but also the composition may be quite different as, for example, in Example 3. Porosity may also be produced or increased by other means, for example by employing a combustible material in the mix as illustrated in Examples 3 and 5. It is important, however, to employ materials which, at the temperatures reached during heating and sintering, do not react with the dielectric composition used and deleteriously affect the dielectric properties of the latter. Those skilled in the art are familiar with the effects of various materials and can readily make proper choices thereof.

Further, it will be understood that there are available commercially many media or vehicles which can be used for forming films and/or making screen printing compositions from fine ceramic particles according to the present invention and that many more such vehicles are known to those skilled in the art. Essentially the purpose of such a medium or vehicle is to suspend the ceramic particles and provide a temporary or fugitive bond therefor during formation of leaves and/or layers therefrom and during subsequent handling of such leaves and/or layers and the consolidation of a plurality thereof into green ceramic bodies prior to sintering. In the sintered bodies the temporary or fugitive bond has disappeared. Accordingly, the medium or vehicle used is a matter of choice or convenience and in most instances any change in the composition bonded thereby will require some change or modification, e.g. adjustment of viscosity, in any medium or vehicle employed.

Monolithic capacitors according to the present invention may vary widely in size. Not only may the dimensions of the capacitor be varied, but the number and thickness of the strata therein may also vary. Although in most cases it is preferred to make the dielectric strata thicker than the conductive layers, this is subject to variation as desired. Capacitors as small as 2.0 × 3.0 × 0.9 mm with 20 dielectric strata as thin as about 0.03 mm and 19 porous strata as thin as about 0.015 mm can be readily made, and larger ones are, of course, possible. Capacitors of any desired capacitance may be obtained according to the invention by proper choice of dielectric material and the size, thickness, and number of the strata. It will be understood that one or more extra or additional dielectric leaves or sheets may be placed at the bottom and/or top of a stack of alternated dielectric leaves or sheets and leaves or sheets containing a ceramic composition adapted to form porous strata. This is often done to give additional mechanical strength to the capacitors and/or to adjust their thickness. An unprinted leaf or leaves of a dielectric ceramic composition can be used. However the presence of a printed ceramic film on the top dielectric film or leaf of such a stack will ordinarily not be detrimental since after sintering the resultant exposed porous deposit will either not hold an electrode material or such material can be easily removed, for example by sanding.

Firing of small ceramic units or chips to sinter them into unitary bodies is preferably carried out in a kiln in an oxidizing atmosphere, such as air. An electrically heated tunnel kiln or furnace is preferred but other kilns or other heating means may be employed. The temperature and the time of firing will depend on the ceramic compositions employed. Those skilled in the art are familiar with such details, as pointed out above, and with the fact that in general the sintering time necessary varies inversely with the temperature and vice versa. As indicated above, a prolonged period of heating at relatively low temperatures is preferred for removal of the temporary bonds used in the leaves and printed areas. If too rapid heating is employed expansion of gases formed in the decomposition of the temporary bonds may rupture the chips.

In the foregoing description and the examples the leaves of dielectric and/or potentially porous ceramic and the capacitors formed therefrom are rectangular. However, the present invention comprehends capacitors of other shapes. Thus, if desired, monolithic capacitors according to the invention may be triangularly shaped. In such case, obviously, alternate porous strata and the electrodes formed therein can not be exposed on opposite edge faces. Consequently, it will be understood that in the appended claims the term "edge region" is used comprehensively to indicate an area on an edge face of a body regardless of the geometry of the body and whether it has one or a plurality of edges.

In FIG. 6 there is illustrated a typical ceramic multilayer circuit structure 50 such as is used for hybrid integrated circuits. The structure 50 has a ceramic matrix 52 and a plurality of conductors 54 extending into and through the matrix. The thickness of both conductors and matrix is exaggerated in FIG. 6 for convenience in viewing. Hitherto such structures have been expensive to produce and normally would be made by screen printing a metallic paste containing a noble metal such as palladium or platinum in the desired conductor patterns on sheets of desired thickness of a temporary bonded electrically insulating ceramic material such as alumina powder, consolidating the several sheets, and sintering the alumina sheets into a unitary body.

As mentioned above, such ceramic multilayer circuit structures may also be produced by techniques essentially similar to the processes disclosed above for producing monolithic capacitors, thus avoiding the necessity for using expensive noble metals as conductors. The production of such a structure as shown in FIG. 6 by the technique of the present invention will be briefly described with reference to FIG. 7.

The sheets or films A, B, and C shown in FIG. 7 are formed in the desired size, shape, and thickness by casting, molding, or the like a desired ceramic, electrical insulating composition, for example finely divided alumina, using a resin, ethyl cellulose, or the like as a temporary bond therefor. Pseudoconductors following the paths of the desired conductors in and/or on the structure as shown at 60 are then screen printed on the sheets or films using a ceramic material in a suitable vehicle or squeegee medium, the ceramic material being one, e.g. coarser alumina powder, which upon firing to sintering temperature will develop a network of interconnected pores. The sheets are assembled, consolidated, and heated to sinter them into a unitary body all in the same manner as described above in the production of monolithic capacitors. As with the latter, the unitary or monolithic body produced by heating comprises a dense matrix of the ceramic insulating composition having therein areas of ceramic material, which may be the same or different in composition, characterized by a network of interconnected pores. Each of said areas extends to at least one region on an outer face, e.g. an edge face, of said body. Conductors in and through said bodies are formed by introducing into the porous areas a suitable conductive material, metal being usually preferred. An appropriate one of the procedures described above for such introduction may be used. Leads may be attached by suitable known means to exposed conductors where desired and small components such as transistors, diodes, etc. may be soldered at predetermined points, leads therefrom extending if desired, to underlying conductors 54 through holes 62 provided originally in one or more of the sheets. If desired, one or more of the holes 62 may be filled with the pseudoconductive material when it is applied to the faces of the sheets.

It will be evident from the foregoing description that many variations and modifications of the present invention are possible without departing from the spirit thereof. For example, instead of using leaves of temporarily bonded, powdered dielectric or insulating ceramic material which are formed as distinct entities, sheet-like films of such material in a suitable medium or vehicle may be formed by screen printing on underlying sheets or layers. Also, for example, instead of screen printing the compositions which develop porosity on firing such compositions can be painted on or applied in other ways. Further, although a self-sustaining body is desired for firing, the stack of leaves or of leaves and the layers thereon need not be pressed to consolidate the stack. In some cases, for example, rolling of the stack as it is built up will provide sufficient consolidation.

The terms of position or direction, such as upper, lower, left, right, etc., used herein are with reference to the accompanying drawings and should not be interpreted as limiting the invention or requiring any specific positioning of the capacitors in use.

Except as otherwise indicated, ratios, percentages, and parts referred to herein are ratios, percentages, and parts by weight.

I claim:

1. A monolithic capacitor comprising:
   a. a sintered unitary body;
      1. said body having a matrix of a dielectric ceramic composition, and
      2. a plurality of vertically spaced porous ceramic strata in said matrix, each stratum having a network of interconnected pores and extending to one of a pair of edge regions of said body, alternate strata extending to the same edge region; and
   ·b. conducting material in said porous strata.

2. A monolithic capacitor comprising:
   a. a sintered unitary body;
      1. said body having a matrix of a dielectric ceramic composition, and 2. a plurality of vertically spaced porous ceramic strata in said matrix, each stratum having a network of interconnected pores and extending to one of a pair of edge regions of said body, alternate strata extending to the same edge region;

b. conducting material in said porous strata; and c. a pair of electrodes on said body, each electrode joining the conducting material in the several porous strata that extend to one of said edge regions.

3. A monolithic capacitor as set forth in claim 1 in which said conducting material is a metal.

4. A monolithic capacitor as set forth in claim 1 in which said conducting material is silver.

5. A multilayer circuit structure comprising: a sintered unitary body, said body having a matrix of an electrically insulating ceramic composition, and at least one internal area extending to an edge region of said body composed of a ceramic composition, and at least one internal area extending to an edge region of said body composed of a ceramic composition and characterized by a network of interconnected pores, in which said porous area contains electrical conductive material.

6. A capacitor as set forth in claim 1 in which said dielectric ceramic composition comprises $BaTiO_3$.

7. A capacitor as set forth in claim 1 in which said dielectric ceramic composition comprises $TiO_2$.

8. A capacitor as set forth in claim 1 in which said matrix and said porous strata have the same chemical composition.

9. A capacitor as set forth in claim 1 in which said conducting material is an alloy.

10. A capacitor as set forth in claim 1 in which said conducting material comprises a conductive oxide.

11. A structure as set forth in claim 5 in which said insulating ceramic composition comprises alumina.

12. A structure as set forth in claim 5 in which said conducting material comprises a metal.

* * * * *